Nov. 7, 1950  H. E. FLYNT  2,528,689
PEANUT DIGGER
Filed Aug. 10, 1945  2 Sheets-Sheet 1
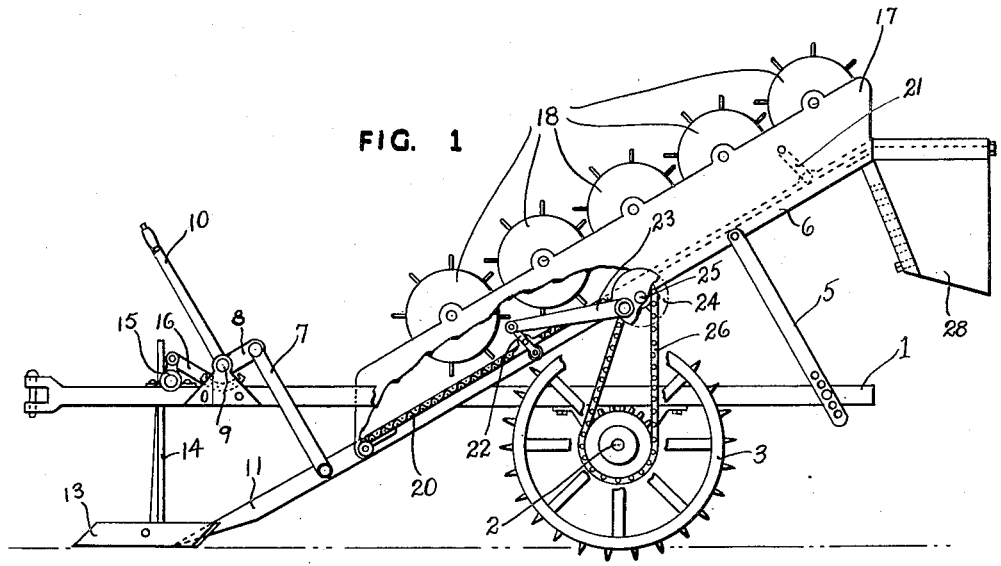
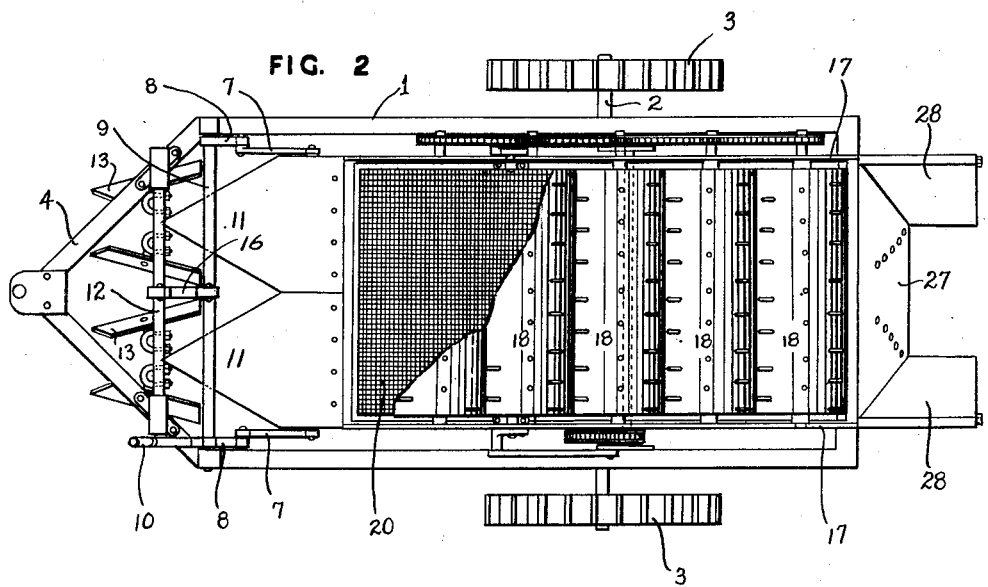
Inventor
HUBERT E. FLYNT, Nov. 7, 1950

H. E. FLYNT 2,528,689

PEANUT DIGGER

Filed Aug. 10, 1945

Inventor
HUBERT E. FLYNT,

Attorneys

Patented Nov. 7, 1950

2,528,689

UNITED STATES PATENT OFFICE 2,528,689

PEANUT DIGGER

Hubert E. Flynt, Greenway, Ark.

Application August 10, 1945, Serial No. 609,966

4 Claims. (Cl. 55—51)

This invention relates to harvesting machines, and more particularly to a machine for harvesting peanuts.

A main object of the invention is to provide a novel and improved machine for digging peanuts from the ground and for removing dirt from the plants with the peanuts attached while feeding the plants to a point of deposit.

A further object of the invention is to provide an improved peanut harvesting machine adapted to be drawn by a tractor or other suitable source of motive power, the machine being adapted to dig the peanut plants from the ground, remove the soil from the plants and to deposit the plants in a neat row for collection.

Further objects and advantages of the invention will appear from the following description and claims, and from the accompanying drawings, wherein:

Figure 1 is a side elevational view of a peanut harvesting machine according to this invention.

Figure 2 is a plan view of the structure of Figure 1.

Figure 3:
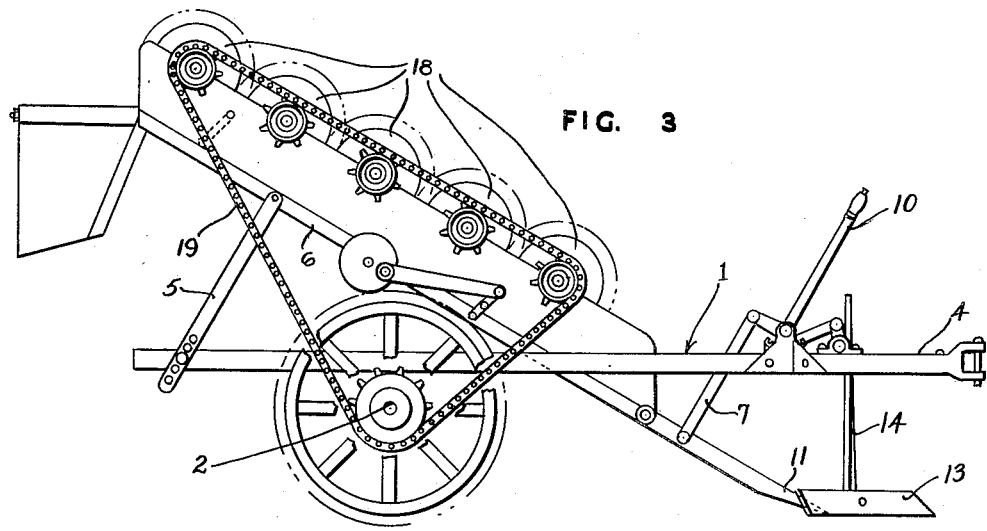
Figure 3 is a side elevational view of the structure taken on the side opposite to that of Figure 1.
Figure 4:
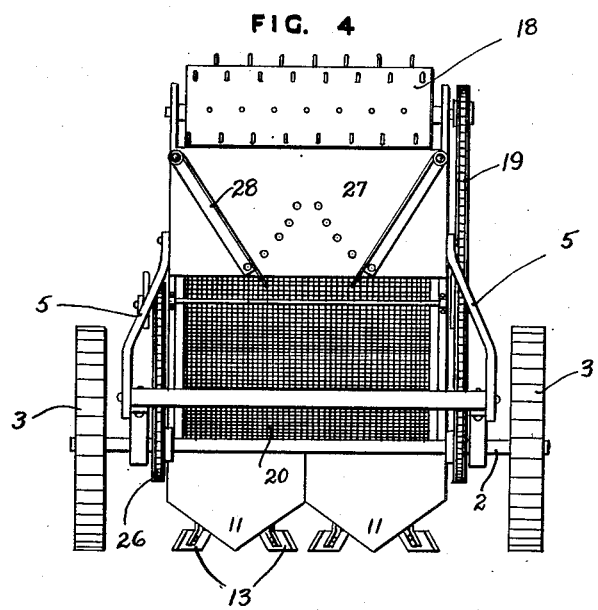
Figure 4 is a rear end elevational view of the harvesting machine of Figure 1.

Referring to the drawings, 1 designates the frame of the machine, said frame being mounted on an axle 2 journaled with respect to the frame and provided with toothed wheels 3, 3. The forward end of frame 1 is formed with a hitching structure 4 for attachment to a tractor.

Supported from the rear portion of main frame 1 by a pair of adjustable supporting bars 5, 5 is an inclined sub-frame 6 supported at its forward end by manually-operated link and lever means including a pair of hanger links 7, 7 pivotally secured to lever members 8, 8 carried by a transverse shaft 9 journaled in frame 1. Rotation of shaft 9 and consequent raising or lowering of the forward portion of sub-frame 6 is accomplished by a hand lever 10 secured to shaft 9 at the side of the machine.

The forward end of sub-frame 6 is provided with a pair of downwardly and forwardly projecting pointed plow members 11, 11, the pointed ends of which are spaced apart a distance corresponding to the spacing between two rows of peanut plants so that two rows may be simultaneously harvested by the machine.

Rotatably mounted on the hitching portion 4 of frame 1 is a transverse shaft 12 carrying secured thereto two pairs of scraper blades 13, each pair of scraper blades 13 being positioned in advance of a plow member 11 and being oriented so as to deflect most of the soil around the rows of plants away from the advancing plow point. The scraper blades 13 are mounted on vertical bars 14 adjustably secured to shaft 12, by U-bolts, so that the scraper blades may be set to desired elevations. At the center of shaft 12 an upstanding arm 15 is rigidly secured, said arm 15 being connected by a link 16 to a depending arm rigidly secured to shaft 9 constituting link and lever means operatively connecting the movable scraper supports with the plow elevating link and lever means so that, by rotating lever 10 in a counterclockwise direction, as viewed in Figure 1, plow points 11 and scraper blades 13 are simultaneously rotated to clear positions with respect to the ground, as when turning the machine to start operations on a new pair of rows of plants.

Sub-frame 6 is provided with side walls 17, 17 in which are journaled a plurality of transverse shafts carrying toothed raking drums 18 arranged in a rearward series along the upwardly inclined length of sub-frame 6. Toothed raking drums 18 are driven in a clockwise direction responsive to forward motion of the machine, as viewed in Figure 3, by chain and sprocket means including a drive chain 19 engaging sprocket wheels provided on the respective raking drums and being driven by a sprocket wheel mounted on axle 2. The raking drums 18 are effective to move the plants dug up by the pointed plow members upwardly and rearwardly on the sub-frame 6.

Slidably mounted for longitudinal oscillation on sub-frame 6 is a sifter screen 20 which is suspended from walls 17 of the sub-frame by hanger links 21 adjacent the rear end of the sub-frame. Longitudinal oscillation or shaking of screen 20 is produced by oscillating arms 22 pivotally secured to sub-frame 6 at their lower ends and pivotally connected at their upper ends to crank arms 23 eccentrically and pivotally connected to discs 24 pivotally secured to sub-frame 6 on a transverse shaft 25 journaled thereon, said shaft being driven by a chain 26 and appropriate sprocket wheels from axle 2. Arm 22 is pivotally secured to screen 20 at an intermediate point on said arm so that oscillation of said arm produced by rotation of axle 2 through the intervening connections results in a longitudinal oscillation or shaking of screen 20. Loose dirt carried by the peanut plants in their rearward and upward motion along sub-frame 6 is thereby agitated and sifted out, said dirt dropping through the screen to the ground beneath as the machine moves forward.

The rear end of sub-frame 6 is provided with a downwardly and rearwardly extending transverse deflector plate 27 and a pair of downwardly and inwardly extending side deflector plates 28, 28, said side plates being adjustable in their angles of downward inclination so that the harvested plants may be deposited in a row of desired width.

In operation, the scraping blades 13 clear away the major part of the soil around the rows of plants. The pointed plow members 11, 11 dig up the plants which by forward motion of the machine are moved into engagement with the raking drums 18, said drums moving the plants upwardly and rearwardly on the oscillating screen 20. All loose dirt is shaken from the plants by the agitating action of the screen. The plants are then fed from the rear end of sub-frame 6 by the rearmost toothed raking drum downwardly onto rear deflector plate 27 between side deflector plates 28, 28 and deposited in a neat row behind the advancing machine.

While a specific embodiment of a peanut harvesting machine has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. In a peanut harvesting machine including a main frame having a traction hitch structure at one end thereof, an axle and a pair of wheels supporting said main frame, a sub-frame inclined forwardly and downwardly relative to said main frame, adjustably mounted bars pivotally supporting the rear end portion of said sub-frame above the rear end portion of said main frame, and plow means carried on the forward end of said sub-frame, means carried by said frame for elevating plants from said plow means and removing adhering earth therefrom comprising a plurality of raking drums journaled on said sub-frame operative to elevate peanut plants from said plow means to the rear end of said sub-frame, chain and sprocket means drivingly connecting said raking drums with the main frame supporting wheels, a sifter screen carried by said sub-frame below said raking drums, and eccentric means driven by said main frame supporting wheels and operatively connected with said sifter screen to impart oscillating movement thereto to remove earth from peanut plants moved along said sub-frame by said raking drums.

2. A peanut harvesting machine comprising a main frame, an axle and a pair of wheels supporting said main frame, a sub-frame pivotally supported at its rear end above the rear end of said main frame, plow means on the front end of sub-frame, manually operated, plow elevating link and lever means operatively connected between said main frame and the front end of said sub-frame, scrapers carried by said main frame in front of said plow means, movable scraper supporting means depending from said main frame, link and lever means connecting said scraper supporting means with said plow elevating means for movement of said scrapers simultaneously with movement of said plow means relative to said main frame, and means carried by said sub-frame for elevating plants from said plow means and removing adhering earth therefrom.

3. A peanut harvesting machine comprising a main frame, an axle and a pair of wheels supporting said main frame, a sub-frame pivotally supported at its rear end above the rear end of said main frame, plow means on the front end of said sub-frame, manually operated, plow elevating link and lever means operatively connected between said main frame and the front end of said sub-frame, scrapers carried by said main frame in front of said plow means, movable scraper supporting means depending from said main frame, link and lever means connecting said scraper supporting means with said plow elevating means for movement of said scrapers simultaneously with movement of said plow means relative to said main frame, and means carried by said sub-frame for elevating plants from said plow means and removing adhering earth therefrom, and a group of deflector plates at the rear end of said sub-frame to receive said plants and deposit them in a windrow at the rear of said machine.

4. In a peanut harvesting machine including a main frame, an axle and a pair of wheels supporting said main frame, a sub-frame pivotally supported at its rear end above the rear end of said main frame, and plow means on the front end of said sub-frame, means carried by said sub-frame for elevating plants from said plow means and removing adhering earth therefrom comprising a series of transverse raking drums journaled on said sub-frame, chain and sprocket means drivingly connecting said drums with said wheels, a sifter screen below said drums, link means pivotally suspending said sifter screen from said sub-frame, screen shaking means operatively connected between said sub-frame and said screen, and chain and sprocket means drivingly connecting said screen shaking means with said wheels.

HUBERT E. FLYNT.

REFERENCES CITED

The following references are of record in the file of this patent:

UNITED STATES PATENTS

| Number | Name | Date |
| --- | --- | --- |
| 612,854 | Liezen | Oct. 25, 1898 |
| 944,945 | Calkins | Dec. 28, 1909 |
| 1,159,110 | Silberberg | Nov. 2, 1915 |
| 1,193,746 | Winters | Aug. 8, 1916 |
| 2,080,336 | Powell | May 11, 1937 |
| 2,187,206 | Lloyd-Jones | Jan. 16, 1940 |

FOREIGN PATENTS

| Number | Country | Date |
| --- | --- | --- |
| 7,205 | Norway | Apr. 24, 1899 |